US010764371B2

(12) United States Patent
Rao et al.

(10) Patent No.: US 10,764,371 B2
(45) Date of Patent: Sep. 1, 2020

(54) HOST DEVICE WITH MULTI-PATH LAYER CONFIGURED TO PROVIDE CLUSTER IDENTIFICATION INFORMATION TO STORAGE SYSTEM

(71) Applicant: EMC IP Holding Company LLC, Hopkinton, MA (US)

(72) Inventors: Vinay G. Rao, Bangalore (IN); Subin George, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 89 days.

(21) Appl. No.: 16/034,625

(22) Filed: Jul. 13, 2018

(65) Prior Publication Data

US 2020/0021653 A1 Jan. 16, 2020

(51) Int. Cl.
*H04L 29/08* (2006.01)
*H04L 12/24* (2006.01)
*G06F 13/20* (2006.01)
*G06F 3/06* (2006.01)
*G06F 9/38* (2018.01)

(52) U.S. Cl.
CPC .......... *H04L 67/1097* (2013.01); *G06F 3/061* (2013.01); *G06F 3/067* (2013.01); *G06F 3/0659* (2013.01); *G06F 9/3891* (2013.01); *G06F 13/20* (2013.01); *H04L 41/08* (2013.01); *G06F 2213/0036* (2013.01)

(58) Field of Classification Search
CPC ..... H04L 67/1097; H04L 41/08; G06F 3/061; G06F 3/0659; G06F 3/067; G06F 9/3891; G06F 13/20; G06F 2213/0036
See application file for complete search history.

(56) References Cited

U.S. PATENT DOCUMENTS 6,687,746 B1 2/2004 Shuster et al.
6,697,875 B1 2/2004 Wilson
(Continued)

OTHER PUBLICATIONS

VMWARE, "Multipathing Configuration for Software iSCSI Using Port Binding," Technical White Paper, Apr. 25, 2012, 15 pages.
(Continued)

*Primary Examiner* — Uzma Alam
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device comprises a set of input-output queues and a multi-path input-output driver configured to select input-output operations from the set of input-output queues for delivery to the storage system over the network. The multi-path input-output driver is further configured to generate a command comprising a cluster identifier of a cluster that includes the first host device and at least a second host device, and to send the command to the storage system over the network. The command is configured for utilization by the storage system to verify that the second host device is part of the same cluster as the first host device. The command may further comprise a group identifier for utilization by the storage system to identify the first host device of the cluster having the cluster identifier.

20 Claims, 3 Drawing Sheets

(56) References Cited

U.S. PATENT DOCUMENTS

| | | | |
|---|---|---|---|
| 7,454,437 | B1 | 11/2008 | Lavallee et al. |
| 7,617,292 | B2 * | 11/2009 | Moore .................... H04L 29/06 709/216 |
| 7,818,428 | B1 | 10/2010 | Lavallee et al. |
| 7,925,872 | B2 | 4/2011 | Lai et al. |
| 8,285,825 | B1 * | 10/2012 | Nagaraj .............. H04L 41/0893 709/223 |
| 9,594,780 | B1 | 3/2017 | Esposito et al. |
| 9,647,933 | B1 * | 5/2017 | Tawri .................. H04L 61/6022 |
| 9,778,852 | B1 | 10/2017 | Marshak et al. |
| 10,289,325 | B1 * | 5/2019 | Bono .................. H04L 67/1097 |
| 10,439,878 | B1 * | 10/2019 | Tah ......................... H04L 69/40 |
| 10,560,315 | B2 * | 2/2020 | Yuan .................. H04L 43/0817 |
| 2002/0103923 | A1 * | 8/2002 | Cherian ................. G06F 3/067 709/235 |
| 2004/0010563 | A1 | 1/2004 | Forte et al. |
| 2008/0043973 | A1 | 2/2008 | Lai et al. |
| 2011/0197027 | A1 | 8/2011 | Balasubramanian et al. |
| 2016/0117113 | A1 | 4/2016 | Li et al. |
| 2017/0339005 | A1 * | 11/2017 | Yuan ....................... H04L 29/08 |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653 filed in the name of Maneesh Pusalkar et al. on Oct. 27, 2017 and entitled "Storage System with Network-Wide Configurable Device Names."

U.S. Appl. No. 15/849,828 filed in the name of Sanjib Mallick et al. on Dec. 21, 2017 and entitled "Storage System with Input-Output Performance Control Utilizing Application Process Detection."

NVM Express, "NVMe Specification," Revision 1.3, May 1, 2017, 282 pages.

* cited by examiner

HOST DEVICE WITH MULTI-PATH LAYER CONFIGURED TO PROVIDE CLUSTER IDENTIFICATION INFORMATION TO STORAGE SYSTEM

FIELD

The field relates generally to information processing systems, and more particularly to storage in information processing systems.

BACKGROUND

Storage arrays and other types of storage systems are often shared by multiple host devices over a network. However, problems can arise in such arrangements when the host devices are configured in one or more clusters. For example, a storage array typically has no reliable way of determining if the particular host devices that it is in communication with are part of one or more clusters of host devices. In some situations, two or more host devices may be attempting to access the same logical storage volume or other type of storage device on the storage array, which would generally not be permitted unless the two or more host devices are part of the same cluster, but the storage array is unable to reliably verify that those host devices are indeed part of the same cluster. It would be highly beneficial in these and numerous other situations if the storage array could reliably determine common cluster membership of the particular host devices with which it communicates.

SUMMARY

Illustrative embodiments configure a multi-path layer of one or more host devices to include functionality for providing cluster identification information to a storage array or other type of storage system. The multi-path layer illustratively comprises at least one multi-path input-output (MPIO) driver configured to process input-output (IO) operations of at least one host device. The multi-path layer in such arrangements can be configured to incorporate a cluster host identifier in a vendor unique command or other type of command issued for a particular host device. The cluster host identifier illustratively comprises a cluster identifier of the cluster that includes the particular host device, and an associated group identifier that can be utilized by the storage system to identify the particular host device.

Such an arrangement allows the storage system to reliably determine the cluster to which a given host device belongs. This reliable determination in turn provides significant additional benefits in the storage system. For example, the storage system can utilize the cluster identifier in order to detect and block various errors that might otherwise arise from multiple host devices that are not part of the same cluster attempting to access the same storage device or group of storage devices.

Moreover, arrangements of this type advantageously overcome the problems that might otherwise arise in those situations in which a given storage device reservation entered by one host device of a cluster is subsequently "blown away" or pre-empted by another host device of the same cluster. Without the cluster identification information provisioning techniques disclosed herein, the storage system cannot reliably utilize such storage device reservation information to determine which host devices are part of the same cluster.

In one embodiment, an apparatus comprises a first host device configured to communicate over a network with a storage system comprising a plurality of storage devices. The first host device includes a set of IO queues and an MPIO driver configured to select IO operations from the set of IO queues for delivery to the storage system over the network. The MPIO driver is further configured to generate a command comprising a cluster identifier of a cluster that includes the first host device and at least a second host device, and to send the command to the storage system over the network. The command is configured for utilization by the storage system to verify that the second host device is part of the same cluster as the first host device. For example, such verification is illustratively performed in conjunction with extraction in the storage system of cluster identifiers from respective first and second commands received from the respective first and second host devices.

A given such command in some embodiments further comprises a group identifier for utilization by the storage system to identify the corresponding host device of the cluster having the cluster identifier.

In some embodiments, the command comprises a vendor unique command configured to incorporate the cluster identifier. The command may be sent to the storage system in conjunction with a host registration process. Other types of commands including registration commands may be configured to incorporate the cluster identifier. In some embodiments, the command comprises a Small Computer System Interface (SCSI) command modified to incorporate the cluster identifier, although other types of SCSI or non-SCSI commands configured to carry a cluster identifier can be used in other embodiments.

The MPIO driver in some embodiments comprises a user-space portion and a kernel-space portion, with the user-space portion being configured to obtain the cluster identifier from clustering software running on the host device.

The cluster identifier in some embodiments uniquely identifies the cluster comprising the first and second host devices from among a plurality of other clusters each comprising a set of other host devices.

As indicated above, the storage system may be configured to utilize cluster identifiers extracted from respective commands to verify that the second host device is part of the same cluster as the first host device.

Additionally or alternatively, cluster identifiers extracted from respective commands can be utilized to support other types of beneficial functionality in the storage system.

For example, the storage system in some embodiments is configured to utilize cluster identifiers extracted from respective commands to confirm that the first and second host devices are part of an active-active replication pair, to prevent one or more host devices that are not part of the cluster from accessing a given one of the storage devices that is being accessed by one or more of the host devices of the cluster, and/or to ensure that the host devices of the cluster utilize a common device name for a given one of the storage devices that is being accessed by one or more of the host devices of the cluster.

As another example, the storage system can be configured to utilize cluster identifiers extracted from respective commands to block one or more actions that might otherwise violate one or more storage system restrictions relating to the cluster.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
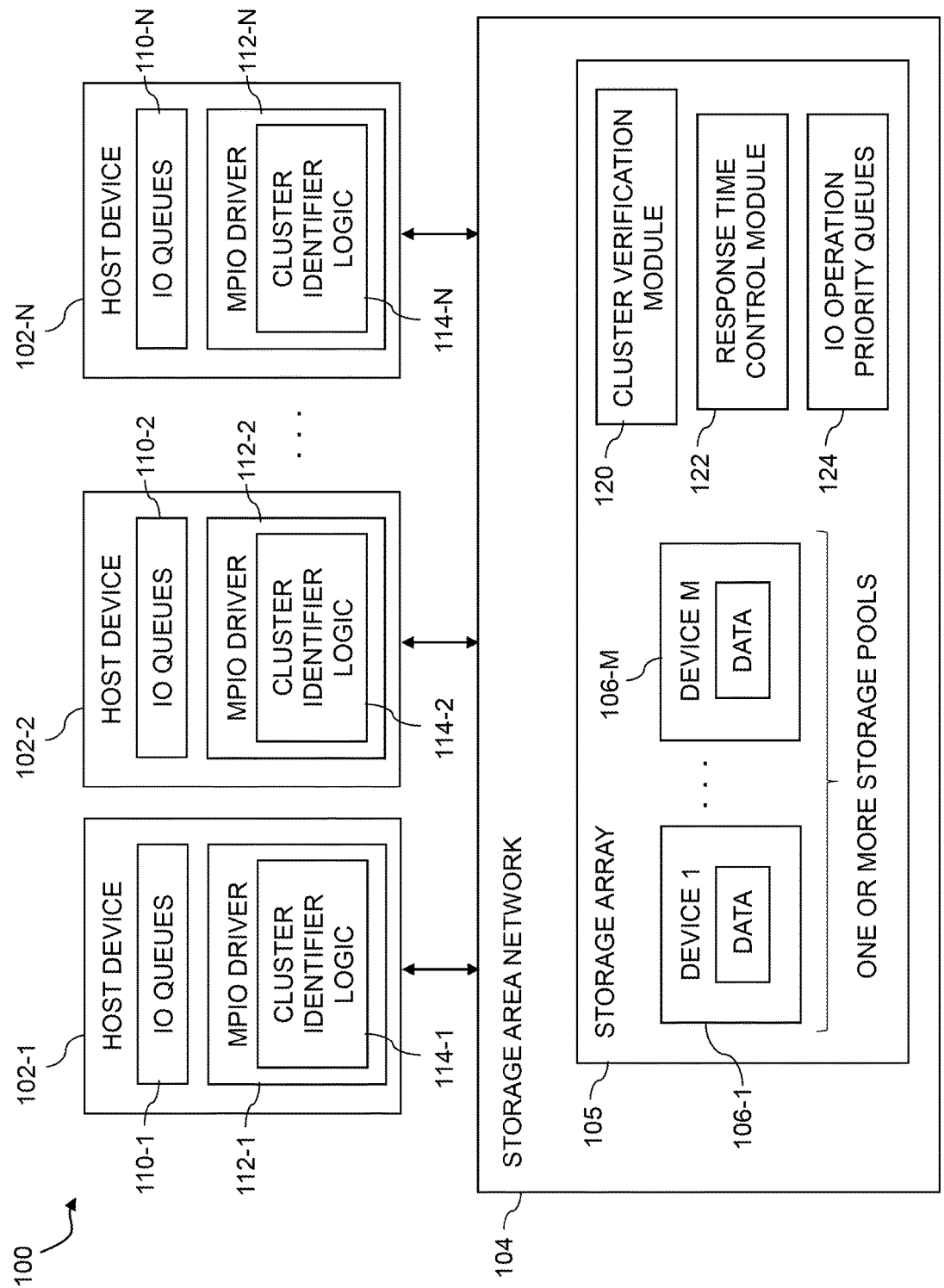
FIG. 1 is a block diagram of an information processing system configured with functionality for providing cluster identification information to a storage array via a multi-path layer of a host device in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides cluster identification information to a storage array using respective instances of cluster identifier logic 114-1, 114-2, . . . 114-N implemented within the MPIO drivers 112.

The MPIO drivers 112 may comprise, for example, otherwise conventional MPIO drivers, such as PowerPath drivers from Dell EMC, suitably modified in the manner disclosed herein to provide cluster identification information to the storage array 105. Other types of MPIO drivers from other driver vendors may be suitably modified to incorporate functionality for providing cluster identification information to a storage array or other type of storage system as disclosed herein.

The multi-path layer comprising MPIO drivers 112 supports multiple paths between each of the host devices 102 and the storage array 105. These paths are illustratively associated with respective initiator-target pairs, with each initiator comprising a host bus adaptor (HBA) or other initiating entity of a given host device such as the host device 102-1 and each target comprising a port or other targeted entity corresponding to one or more of the storage devices 106 of the storage array 105. As noted above, the storage devices 106 illustratively comprise LUNs or other types of logical storage devices.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers 112 of the multi-path layer as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers 112 utilize the multiple paths described above to send TO operations from the host devices 102 to the storage array 105.

For example, the MPIO driver 112-1 is configured to select TO operations from its corresponding set of TO queues 110-1 for delivery to the storage array 105 over the SAN 104. The sources of the TO operations stored in the set of TO queues 110-1 illustratively include respective processes of one or more applications executing on the host device 102-1. Other types of sources of TO operations may be present in a given implementation of system 100.

The MPIO driver 112-1 is further configured to generate a command comprising a cluster identifier of a cluster that includes the first host device 102-1 and at least a second one of the host devices 102, and to send the command to the storage array 105 over the SAN 104. The command is configured for utilization by the storage array 105 to verify that the second host device is part of the same cluster as the first host device 102-1.

The cluster identifier is illustratively configured to uniquely identify the cluster comprising the first and second host devices from among a plurality of other clusters each comprising a set of other host devices.

The above-noted verification is illustratively performed in conjunction with extraction in the storage array 105 of cluster identifiers from respective first and second commands received from the respective first and second host devices.

A given such command in some embodiments further comprises a group identifier for utilization by the storage array 105 to identify the corresponding host device of the cluster having the cluster identifier.

The command in some embodiments is referred to as a cluster host identifier command and further comprises a group identifier for utilization by the storage array 105 to identify a corresponding one of the first and second host devices 102 of the cluster having the cluster identifier. The group identifier is illustratively a type of unique identifier utilized in the system 100 to uniquely identify a group of initiators of a particular host device. One possible example of a cluster host identifier command of this type will be described in more detail below in conjunction with FIG. 3.

The command illustratively comprises a "vendor unique command" or VU command configured to incorporate the cluster identifier. The command may be sent to the storage system in conjunction with a host registration process, such as a SCSI-3 registration/reservation process. Other types of commands including registration commands may be configured to incorporate the cluster identifier.

In some embodiments, the command comprises a SCSI command modified to incorporate the cluster identifier, although other types of SCSI or non-SCSI commands configured to carry a cluster identifier can be used in other embodiments.

The MPIO driver 112-1 in some embodiments comprises a user-space portion and a kernel-space portion, with the user-space portion being configured to obtain the cluster identifier from clustering software running on the host device 102-1.

Arrangements of the type described above advantageously allow the storage array 105 to verify that the second host device 102-2 is part of the same cluster as the first host device 102-1.

Additionally or alternatively, commands from the MPIO drivers 112 containing cluster identification information can be utilized to support other types of beneficial functionality in the storage array 105.

For example, the storage array 105 in some embodiments is configured to utilize cluster identifiers extracted from respective commands to confirm that the first and second host devices are part of an active-active replication pair.

As another example, the storage array 105 in some embodiments is configured to utilize cluster identifiers extracted from respective commands to prevent one or more host devices that are not part of the cluster from accessing a given one of the storage devices that is being accessed by one or more of the host devices of the cluster.

As a further example, the storage array 105 in some embodiments is configured to utilize cluster identifiers extracted from respective commands to ensure that the host devices of the cluster utilize a common device name for a given one of the storage devices that is being accessed by one or more of the host devices of the cluster.

As yet another example, the storage array 105 can be configured to utilize cluster identifiers extracted from respective commands to block one or more actions that might otherwise violate one or more storage array restrictions relating to the cluster.

As noted above, the commands utilized in a given embodiment can include commands that are part of a standard command set or may include custom commands such as a "vendor unique command" or VU command that is not part of a standard command set.

For example, in some embodiments, cluster identifiers may be incorporated into respective command descriptor blocks of corresponding commands directed from the host device 102-1 to the storage array 105. More particularly, a given one of the cluster identifiers may be incorporated into a VU field of the command descriptor block of the corresponding command. Numerous other arrangements are possible.

The above-described cluster identification information provision functions of the MPIO driver 112-1 are carried out at least in part under the control of its instance of cluster identifier logic 114-1. For example, the cluster identifier logic 114-1 is illustratively configured to control performance of portions of the process shown in the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104, and to perform the disclosed functionality for providing cluster identification information to the storage array 105. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support provision of cluster identification information to a storage array or other type of storage system.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent provision of cluster identification information to the storage array 105 as disclosed herein, the storage array 105 would typically have no reliable way of determining if the particular host devices 102 that it is in communication with are part of one or more clusters of host devices.

Such drawbacks are advantageously overcome in illustrative embodiments herein by utilization of a multi-path layer comprising one or more of the MPIO drivers 112 to provide cluster identification information to the storage array 105 as described above. These embodiments allow the storage array 105 to reliably determine common cluster membership of the particular host devices 102 with which it communicates. This supports numerous different cluster verification use cases in the storage array 105 that would not otherwise be possible, thereby significantly improving the performance of the storage array 105.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D)(Point™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The persistent memory of the storage array 105 in some embodiments is utilized to store at least portions of the above-described cluster identification information, which may be arranged into one or more tables or other suitable data structures by the storage array 105 in order to support various types of cluster-related functionality of system 100.

The storage array 105 in the present embodiment further comprises additional components including a cluster verification module 120, a response time control module 122 and IO operation priority queues 124, illustratively configured to make use of the above-described persistent memory.

The cluster verification module 120 is configured to perform various types of tests or other verification processes utilizing the cluster identification information provided by the multi-path layer of the host devices 102. In performing this function, the cluster verification module 120 illustratively makes use of the above-described tables or other data structures containing cluster identification information including cluster identifiers extracted from respective commands provided by the multi-path layer. At least portions of such information are stored in the persistent memory of the storage array 105.

For example, the cluster verification module 120 of the storage array 105 in some embodiments is configured to utilize the cluster identifiers extracted from respective commands to perform the various different types of verification noted above, which include at least the following:

1. Confirming that the first and second host devices are part of an active-active replication pair. In one possible implementation of such an arrangement, a maintenance procedure that is executed by the storage array in conjunction with one host device of the active-active replication pair being brought offline will be able to first verify that a corresponding storage device or group of storage devices can still be accessed via the other host device in the same cluster.

2. Preventing one or more host devices that are not part of the cluster from accessing a given one of the storage devices that is being accessed by one or more of the host devices of the cluster.

3. Ensuring that the host devices of the cluster utilize a common device name for a given one of the storage devices that is being accessed by one or more of the host devices of the cluster. Such an arrangement simplifies resource mapping within the cluster.

4. Blocking one or more actions that might otherwise violate one or more storage array restrictions relating to the cluster.

These are examples of different types of cluster verification that may be performed by the cluster verification module 120 utilizing cluster identification information provided by the multi-path layer of the host devices 102. Other types of cluster verification can be performed in other embodiments.

The response time control module 122 is illustratively utilized to implement storage array based adjustments in response time for particular TO operations based at least in part on service level objective (SLO) information stored by the storage array 105 in its persistent memory. The response time control module 122 operates in conjunction with the TO operation priority queues 124.

The storage array 105 utilizes its TO operation priority queues 124 to provide different levels of performance for TO operations. For example, the TO operation priority queues 124 may have respective different priority levels. The storage array 105 may be configured to provide different priority levels for different ones of the TO operations by assigning different ones of the TO operations to different ones of the TO operation priority queues 124. The TO operation priority queues 124 are illustratively associated with respective SLOs for processing of TO operations in the storage array 105.

Process tags may be used in assigning different ones of the IO operations to different ones of the IO operation priority queues 124, as disclosed in U.S. patent application Ser. No. 15/849,828, filed Dec. 21, 2017, now U.S. Pat. No. 10,474,367, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support provision of cluster identification information control through interaction with a multi-path layer as disclosed herein.

For example, the storage array 105 may comprise one or more storage arrays such as VNX®, Symmetrix VIVIAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of cluster identifier logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising multiple host devices and a shared storage system. The shared storage system in this embodiment is assumed to comprise at least one storage array having a plurality of storage devices. Steps 200 and 202 in the present embodiment are illustratively performed primarily by a given host device, and steps 204 and 206 are performed primarily by the storage array, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, an MPIO driver in a first host device generates a command comprising a cluster identifier of a cluster that includes the first host device and at least a second host device. The cluster identifier uniquely identifies the cluster comprising the first and second host devices from among a plurality of other clusters each comprising a set of other host devices. The MPIO driver is illustratively configured to obtain the cluster identifier from clustering software running on the host device. For example, the MPIO driver illustratively comprises a user-space portion and a kernel-space portion, with the user-space portion of the MPIO driver being configured to obtain the cluster identifier.

The command generated in step 200 in some embodiments is more particularly referred to as a cluster host identifier command, and further comprises a group identifier for utilization by the storage array 105 to identify a corresponding one of the first and second host devices of the cluster having the cluster identifier.

Figure 3:
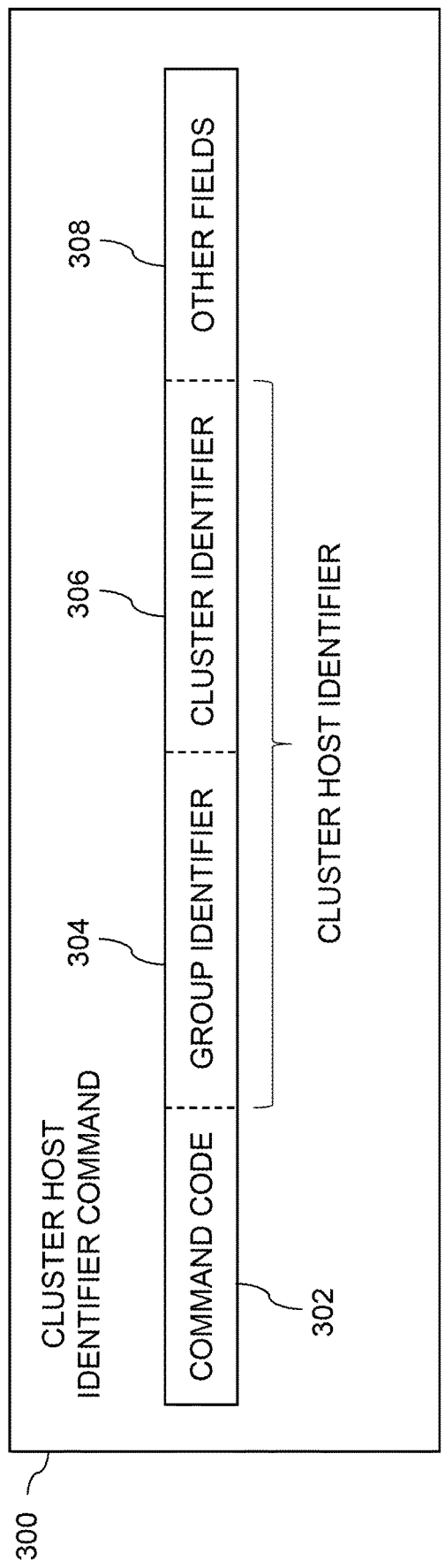
FIG. 3 shows one possible example of a command format utilized in an illustrative embodiment to provide cluster identification information to a storage array via a multi-path layer of a host device.

An example of an arrangement of this type is shown in FIG. 3. In this example, a cluster host identifier command 300 comprises a command code 302 and a cluster host identifier that comprises a group identifier 304 and a cluster identifier 306. The cluster host identifier command 300 further comprises one or more other fields 308.

The group identifier 304 is a unique number per host device that is utilized in the storage array to allow a given storage device to recognize all initiators that belong to the same host device. The MPIO driver on the host device can generate the group identifier using at least a portion of an IP address of the host device. For example, the host device may have multiple network interface cards (NICs) each having a separate IP address, and the MPIO driver can utilize a selected one (e.g., the lowest) of these IP addresses, possibly in combination with a unique hardware number and/or a host name, in generating the group identifier 304. For host devices without IP connectivity, other types of numbers may be used in generating the group identifier. These and other arrangements illustratively provide a group identifier in the form of a World Wide Name (WWN) or World Wide Identifier (WWID).

The other fields 308 illustratively comprise fields that are part of a conventional implementation of a command in a similar standard or non-standard command format.

The cluster host identifier command 300 illustratively comprises a vendor unique command configured to incorporate the cluster identifier. The command in some implementations of the FIG. 2 process comprises a SCSI command modified to incorporate the cluster identifier, although non-SCSI commands may also be used, such as NVMeoF commands.

In some embodiments, the command is sent to the storage array 105 in conjunction with a host registration process. For example, the command may be sent to the storage array 105 in conjunction with a SCSI-3 registration/reservation process. Such a command is illustratively directed to a particular storage device of the storage array 105.

Multiple instances of the cluster host identifier command 300 received from MPIO drivers of respective different host devices are illustratively utilized by the storage array to populate a cluster identification information table that is stored in its persistent memory. Additionally or alternatively, cluster identification information obtained from multiple instances of the cluster host identifier command 300 may be utilized to populate additional columns of a host registration table maintained by the storage array in its persistent memory.

In some embodiments, a given cluster identifier may be incorporated at least in part into a group number field of the command descriptor block of the corresponding command. Additionally or alternatively, the given cluster identifier can be incorporated at least in part into a VU field of the command descriptor block of the corresponding command. It is therefore possible in some embodiments that different portions of the given cluster identifier can be incorporated into different parts of a command descriptor block, or in one or more other parts of a corresponding command.

The term "cluster identifier" as used herein is intended to be broadly construed and in some embodiments may be distributed across multiple distinct command fields. The term "command" is also intended to be broadly construed and may comprise a combination of a plurality of individual commands.

Again, the particular command format features described above are examples only, and numerous other SCSI or non-SCSI command formats may be used in other embodiments, including VU commands or other user-defined commands.

Figure 2:
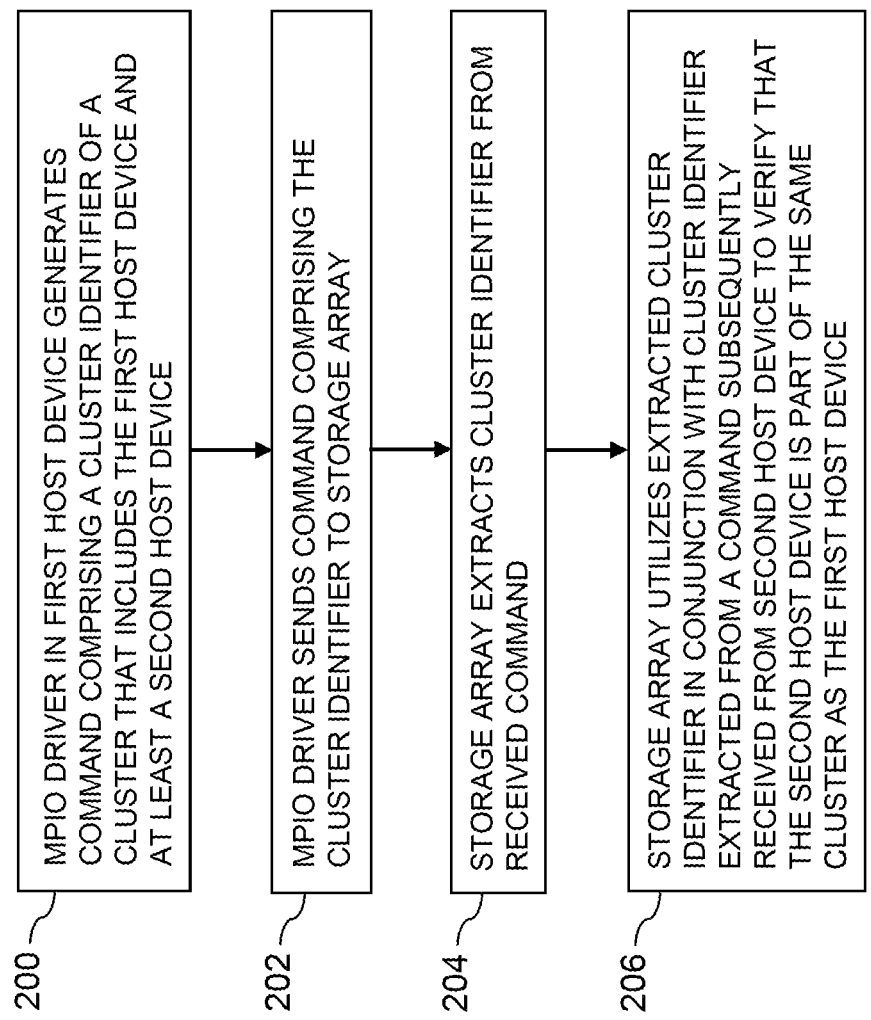
FIG. 2 is a flow diagram of a process for providing cluster identification information to a storage array via a multi-path layer of a host device in an illustrative embodiment.

The description of the steps of the FIG. 2 flow diagram will now resume.

In step 202, the MPIO driver sends the command comprising the cluster identifier to storage array. The storage array is illustratively configured under processor control to comprise a plurality of storage devices and to communicate over one or more networks with the given host device and one or more other host devices.

In step 204, the storage array extracts the cluster identifier from the received command.

In step 206, the storage array utilizes the extracted cluster identifier to verify that the second host device is part of the same cluster as the first host device. This verification illustratively also utilizes a cluster identifier extracted from a command subsequently received from the second host device.

For example, assume that the first host device sends the cluster identifier in a registration command directed to a particular storage device on the storage array. The storage array can extract this cluster identifier and subsequently utilize it to verify that the second host device sending the same cluster identifier in a subsequent registration command directed to the particular storage device is part of the same cluster as the first host device.

However, if the registration command directed to the particular storage device from the second host device includes a second cluster identifier that is different than the cluster identifier previously extracted from the registration command directed to that same storage device from the first host device, the storage array can detect this error condition and reject the registration command from the second host device. The second host device will then know not to send IO operations to the particular storage device from the cluster identified by the second cluster identifier.

The storage array can similarly utilize additional cluster identifiers extracted from respective other commands received from additional host devices to confirm common membership of the host devices in a given cluster. The commands can comprise registration commands or other types of commands.

Such arrangements are considered examples of host device cluster membership verification that can be performed by the storage array utilizing an extracted cluster identifier in illustrative embodiments. A wide variety of alternative cluster verification processes can be performed involving cluster identifiers extracted from respective commands received in a storage array from respective host devices.

As described previously, the storage array performs various additional or alternative cluster verification operations utilizing the extracted cluster identifier, illustratively in combination with one or more other cluster identifiers extracted from one or more other commands sent by MPIO drivers of respective other host devices.

For example, in some embodiments, a first host device registers with the storage array as part of a SCSI-3 registration/reservation process using a registration command that includes a cluster identifier and a group identifier as described above. The storage identifier can utilize that cluster identification information to verify that a second host device upon its registration is part of the same cluster as the first host device. Cluster membership of additional host devices registering after the first and second host devices can be verified in a similar manner.

This provision of cluster identification information to the storage array is particularly advantageous in the context of SCSI-3 reservations in that a storage device reservation entered by one host device of a cluster can be "blown away" or pre-empted by another host device of the same cluster. The storage array can therefore not reliably utilize the reservation information to determine which host devices are part of the same cluster. Illustrative embodiments overcome these and other problems of conventional practice.

As mentioned previously, the cluster identifier in some embodiments is generated by cluster software running on the host devices. The cluster software ensures that the same cluster identifier is shared by all of the host devices in a given cluster.

After completion of step 206 for a given IO operation, the FIG. 2 process may return to step 200 in order to generate and process additional commands possibly from different ones of a plurality of MPIO drivers comprising a multi-path layer of a plurality of host devices. For example, the FIG. 2 process may be iterated to generate and process commands from multiple distinct host devices that share the storage array. Multiple such iterations may be performed at least in part in parallel with one another.

Separate instances of the FIG. 2 process may therefore be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for provision of cluster identification information. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different cluster identification information provision arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The particular cluster identification information provision arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements. For example, some embodiments configure a multi-path layer of one or more host devices to include functionality for providing cluster identification information to a storage array or other type of storage system. The multi-path layer in such arrangements can be configured to incorporate a cluster host identifier in a registration command or other type of command issued for a particular host device. The cluster host identifier illustratively comprises a cluster identifier of the cluster that includes the particular host device, and an associated group identifier that can be utilized by the storage system to identify the particular host device.

Such an arrangement allows the storage system to reliably determine the cluster to which a given host device belongs. This reliable determination in turn provides significant additional benefits in the storage system. For example, the storage system can utilize the cluster identifier in order to detect and block various errors that might otherwise arise from multiple host devices that are not part of the same cluster attempting to access the same storage device or group of storage devices.

Moreover, arrangements of this type advantageously overcome the problems that might otherwise arise in those situations in which a given storage device reservation entered by one host device of a cluster is subsequently "blown away" or pre-empted by another host device of the same cluster. Without the cluster identification information provisioning techniques disclosed herein, the storage system cannot reliably utilize such storage device reservation information to determine which host devices are part of the same cluster.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of cluster identifier logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, cluster identifier logic instances, cluster verification modules and additional or alternative components. Also, the particular configurations of system and device elements and associated processing operations illustratively shown in the drawings can be varied in other embodiments. For example, a wide variety of different MPIO driver configurations and associated cluster identification information provision arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a first host device configured to communicate over a network with a storage system comprising a plurality of storage devices;
the first host device comprising:
a set of input-output queues; and
a multi-path input-output driver configured to select input-output operations from the set of input-output queues for delivery to the storage system over the network;
wherein the multi-path input-output driver is further configured:
to generate a command comprising a cluster identifier of a cluster that includes the first host device and at least a second host device, wherein the cluster identifier is shared by the first host device and at least the second host device, and wherein the cluster identifier uniquely identifies the cluster comprising the first and second host devices from among a plurality of other clusters each comprising a set of other host devices; and
to send the command to the storage system over the network;
wherein the command is configured for utilization by the storage system to verify that the second host device is part of the same cluster as the first host device; and
wherein the storage system is configured to extract the cluster identifier from the command and to utilize the cluster identifier to prevent one or more host devices that are not part of the cluster from accessing a given one of the storage devices that is being accessed by one or more of the host devices of the cluster.

2. The apparatus of claim 1 further comprising the second host device and wherein the second host device comprises a set of input-output queues and a multi-path input-output driver configured to select input-output operations from the set of input-output queues for delivery to the storage system over the network, the multi-path input-output driver of the second host device being further configured to generate a command comprising the cluster identifier of the cluster that includes the first host device and at least the second host device and to send the command to the storage system over the network.

3. The apparatus of claim 1 wherein the command further comprises a group identifier for utilization by the storage system to identify the first host device of the cluster having the cluster identifier.

4. The apparatus of claim 1 wherein the command comprises a vendor unique command configured to incorporate the cluster identifier.

5. The apparatus of claim 1 wherein the command is sent to the storage system in conjunction with a host registration process.

6. The apparatus of claim 1 wherein the command comprises a Small Computer System Interface (SCSI) command modified to incorporate the cluster identifier.

7. The apparatus of claim 1 wherein the multi-path input-output driver comprises a user-space portion and a kernel-space portion.

8. The apparatus of claim 7 wherein the user-space portion of the multi-path input-output driver is configured to obtain the cluster identifier from clustering software running on the host device.

9. The apparatus of claim 1 wherein the storage system is further configured to utilize the cluster identifier to verify that the second host device is part of the same cluster as the first host device.

10. The apparatus of claim 1 wherein the storage system is further configured to utilize the cluster identifier to confirm that the first and second host devices are part of an active-active replication pair.

11. The apparatus of claim 1 wherein the storage system is further configured to utilize the cluster identifier to ensure that the host devices of the cluster utilize a common device name for a given one of the storage devices that is being accessed by one or more of the host devices of the cluster.

12. The apparatus of claim 1 wherein the storage system is further configured to utilize the cluster identifier to block one or more actions that might otherwise violate one or more storage system restrictions relating to the cluster.

13. A method comprising:
configuring a multi-path input-output driver of a first host device to communicate with a storage system over a network;
the multi-path input-output driver:
selecting input-output operations from a set of input-output queues of the first host device for delivery to the storage system over the network;
generating a command comprising a cluster identifier of a cluster that includes the first host device and at least a second host device, wherein the cluster identifier is shared by the first host device and at least the second host device, and wherein the cluster identifier uniquely identifies the cluster comprising the first and second host devices from among a plurality of other clusters each comprising a set of other host devices; and
sending the command to the storage system over the network;
wherein the command is configured for utilization by the storage system to verify that the second host device is part of the same cluster as the first host device; and
wherein the cluster identifier is extracted from the command and utilized by the storage system to prevent one or more host devices that are not part of the cluster from accessing a given one of the storage devices that is being accessed by one or more of the host devices of the cluster.

14. The method of claim 13 wherein the command further comprises a group identifier for utilization by the storage system to identify the first host device of the cluster having the cluster identifier.

15. The method of claim 13 wherein the multi-path input-output driver comprises a user-space portion and a kernel-space portion and wherein the user-space portion of the multi-path input-output driver is configured to obtain the cluster identifier from clustering software running on the first host device.

16. A computer program product comprising a non-transitory processor-readable storage medium having stored therein program code of one or more software programs, wherein the program code, when executed by a first host device comprising a multi-path input-output driver, the first host device being configured to communicate over a network with a storage system, causes the multi-path input-output driver:
to select input-output operations from a set of input-output queues of the first host device for delivery to the storage system over the network;
to generate a command comprising a cluster identifier of a cluster that includes the first host device and at least a second host device, wherein the cluster identifier is shared by the first host device and at least the second host device, and wherein the cluster identifier uniquely identifies the cluster comprising the first and second host devices from among a plurality of other clusters each comprising a set of other host devices; and
to send the command to the storage system over the network;
wherein the command is configured for utilization by the storage system to verify that the second host device is part of the same cluster as the first host device; and
wherein the cluster identifier is extracted from the command and utilized by the storage system to prevent one or more host devices that are not part of the cluster from accessing a given one of the storage devices that is being accessed by one or more of the host devices of the cluster.

17. The computer program product of claim 16 wherein the command further comprises a group identifier for utilization by the storage system to identify the first host device of the cluster having the cluster identifier.

18. The computer program product of claim 16 wherein the multi-path input-output driver comprises a user-space portion and a kernel-space portion and wherein the user-space portion of the multi-path input-output driver is configured to obtain the cluster identifier from clustering software running on the first host device.

19. The computer program product of claim 16 wherein the cluster identifier is further utilized by the storage system to verify that the second host device is part of the same cluster as the first host device.

20. The computer program product of claim 16 wherein the cluster identifier is further utilized by the storage system to ensure that the host devices of the cluster utilize a common device name for a given one of the storage devices that is being accessed by one or more of the host devices of the cluster.

\* \* \* \* \*